(12) United States Patent
Wang et al.

(10) Patent No.: US 10,151,600 B2
(45) Date of Patent: Dec. 11, 2018

(54) SYSTEMS AND METHODS FOR CONTROLLING VIEWPORT MOVEMENT IN VIEW OF USER CONTEXT

(71) Applicant: GOOGLE INC., Mountain View, CA (US)

(72) Inventors: David X. Wang, Arncliffe (AU);
Stephen Broadfoot, Neutral Bay (AU);
Fabian Tamp, Stanmore (AU);
Robertus Christianus Elisabeth Mariet, Mountain View, CA (US);
Taylah Hasaballah, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 367 days.

(21) Appl. No.: 14/952,676

(22) Filed: Nov. 25, 2015

(65) Prior Publication Data

US 2016/0154538 A1 Jun. 2, 2016

Related U.S. Application Data

(60) Provisional application No. 62/167,176, filed on May 27, 2015, provisional application No. 62/084,442, filed on Nov. 25, 2014.

(51) Int. Cl.
| | |
|---|---|
| *G06F 3/0488* | (2013.01) |
| *G01C 21/36* | (2006.01) |
| *G09B 29/00* | (2006.01) |
| *G09B 29/10* | (2006.01) |

(52) U.S. Cl.
CPC ....... *G01C 21/367* (2013.01); *G01C 21/3664* (2013.01); *G06F 3/0488* (2013.01); *G09B 29/007* (2013.01); *G09B 29/10* (2013.01)

(58) Field of Classification Search
CPC .. G01C 21/367; G01C 21/3664; G06F 3/0488
See application file for complete search history.

(56) References Cited

U.S. PATENT DOCUMENTS

| | | | |
|---|---|---|---|
| 6,175,801 B1 * | 1/2001 | Millington | G01C 21/3664 701/428 |
| 6,415,224 B1 * | 7/2002 | Wako | G01C 21/3611 340/903 |
| 7,274,377 B2 | 9/2007 | Ivashin et al. | |
| 7,761,814 B2 | 7/2010 | Rimas-Ribikauskas et al. | |

(Continued)

*Primary Examiner* — Omar R Abdul-Ali
(74) *Attorney, Agent, or Firm* — Marshall, Gerstein & Borun LLP

(57) ABSTRACT

As part of a technique for positioning viewports over interactive digital maps, a digital map of a geographic area is provided via a user interface of a computing device. The currently visible portion of the digital map is displayed in a viewport. A user gesture is detected, where the user gesture communicates a particular acceleration to the viewport, along a particular direction, to move the viewport from its current position to a target position over the digital map. A current user context for the digital map is determined. A new position of the viewport over the digital map is determined in accordance with (i) the user gesture and (ii) the current user context, such that the new position is different from the target position, and the viewport is moved from its current position to the new position.

19 Claims, 14 Drawing Sheets

(56) References Cited

U.S. PATENT DOCUMENTS

| | | | |
|---|---|---|---|
| 8,677,263 B2 | 3/2014 | Oberstein | |
| 8,855,926 B1* | 10/2014 | Murphy | H04W 4/02 |
| | | | 701/400 |
| 8,880,336 B2 | 11/2014 | van Os et al. | |
| 2011/0022310 A1* | 1/2011 | Ishii | B60R 11/0258 |
| | | | 701/532 |
| 2013/0283205 A1* | 10/2013 | Suzuno | G01C 21/367 |
| | | | 715/784 |
| 2013/0321257 A1* | 12/2013 | Moore | G06F 3/0481 |
| | | | 345/156 |
| 2014/0114574 A1* | 4/2014 | Tertoolen | G01C 21/367 |
| | | | 701/533 |
| 2014/0129976 A1* | 5/2014 | Beaurepaire | G01C 21/367 |
| | | | 715/788 |
| 2014/0210739 A1* | 7/2014 | Aono | G06F 3/044 |
| | | | 345/173 |
| 2015/0009163 A1* | 1/2015 | Nakai | G01C 21/3664 |
| | | | 345/173 |

\* cited by examiner

SYSTEMS AND METHODS FOR CONTROLLING VIEWPORT MOVEMENT IN VIEW OF USER CONTEXT

FIELD OF TECHNOLOGY

This disclosure relates to interactive digital maps and, more particularly, to controlling viewports through which visible portions of digital maps are displayed.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Certain software applications, referred to below as "geographic applications," can run on conventional computing devices such desktop and laptop computers, portable devices such as smartphones, or on embedded devices such as head units of vehicles to provide interactive digital maps, navigation directions, geographic search capability, and other geographic functions etc. Some of these applications are configured to provide output and receive input via interfaces that support user gestures, such as "flick" or "tap." Some of these gestures communicate motion to the viewing window, or "viewport," demarcating the frame in which a digital map is displayed. In certain situations, such as when driving, it is difficult for the user to control viewport precisely.

SUMMARY

A geographic software application receives user input via an interface that supports gestures, such as a touchscreen of a smartphone or of a head unit in a vehicle. When the user communicates certain acceleration to the viewport in a certain direction by the flick gesture, the geographic application determines the current context, such as the geometry of a navigation route currently overlaying the digital map, and repositions the viewport in accordance with not only the acceleration and the direction of the flick gesture, but also the context. For example, the geographic application can simulate magnetic attraction of the viewport of the navigation route, and "sticky" ground when the viewport moves away from the navigation route. In this manner, the geographic application makes it more difficult for the user to inadvertently lose sight of the route while viewing the map around her current location along the route, for example.

In particular, one example implementation of these techniques is a method for positioning viewports over interactive digital maps. The method includes providing, by one or more processors, a digital map of a geographic area via a user interface of a computing device, including displaying a currently visible portion of the digital map in a viewport. The method further includes detecting, by one or more processors, a user gesture that communicates a particular acceleration to the viewport, along a particular direction, to move the viewport from its current position to a target position over the digital map, and determining, by one or more processors, a current user context for the digital map. Still further, the method includes determining, by one or more processors, a new position of the viewport over the digital map in accordance with (i) the user gesture and (ii) the current user context, where the new position is different from the target position, and moving the viewport from its current position to the new position.

Another example implementation of these techniques is a computing device including a user interface configured to receive gesture-based input, one or more processors, and a non-transitory memory readable by the one or more processors. The memory stores instructions that, when executed by the one or more processors, cause the computing device to (i) provide a digital map of a geographic area via the user interface, including display a currently visible portion of the digital map in a viewport, (ii) detect a user gesture that communicates a particular acceleration to the viewport, along a particular direction, to move the viewport from its current position to a target position over the digital map, (iii) determine a current user context for the digital map, (iv) determine a new position of the viewport over the digital map in accordance with (a) the user gesture and (b) the current user context, where the new position is different from the target position, and (v) move the viewport from its current position to the new position.

Yet another example implementation of these techniques is a method for positioning viewports over interactive digital maps. The method includes providing a digital map of a geographic area via a user interface of a computing device, including displaying a currently visible portion of the digital map in a viewport. The method further includes overlaying a graphical indication of a navigation route for travelling from a source location to a destination location in the geographic area, detecting a user gesture that communicates a particular acceleration to the viewport, along a particular direction, to move the viewport from its current position to a target position over the digital map, and determining a new position of the viewport over the digital map. Determining the new position includes modifying at least one of the acceleration or the direction communicated by the user gesture in view of the indication of the navigation route. The method further includes moving the viewport from its current position to the new position.

Further, to provide a clear and intuitive indication of where the virtual camera and/or the viewport will be once the user reaches a point farther along the navigation route, the geographic application can display a "ghost" indicator over the navigation route when the user manually advances the viewport toward the destination along the route, or when the geographic application temporarily advances the viewport automatically in a certain situation (e.g., to illustrate the location of a gas station farther along the route, in response to a search query). In some implementations, the ghost indicator has a generally similar visual appearance as the indicator of the current location, but also include a visually distinct characteristic to distinguish from the indicator of the current location. For example, the ghost indicator and the indicator of the current location can have the same shape but different colors.

An example implementation of the techniques for providing a ghost indicator is a method including (i) determining, by one or more processors, a navigation route for travelling from a source location to a destination location in a geographic area; (ii) displaying the navigation route overlaid on a digital map of the geographic area, including displaying a currently visible portion of the digital map in a viewport, via a user interface of a user device; (iii) displaying an indicator of a current location of the user device on the route, and (iv) when the viewport is repositioned over a portion of the route ahead of the current location, displaying an indicator of a future location on the route, where the viewport is centered at the projected future location when the user device reaches the projected future location. In another scenario, at step (iv), the virtual camera is positioned at the location indicated by the indicator of the future location (and, if desired, oriented as indicated by the indicator of the future location) when the digital map is displayed in a three-dimensional format at a street level. In various implementations, the method may include one or more of the following additional features: (i) the viewport is repositioned to a location farther along the route, closer to the destination, in response to the user manually moving the viewport via a gesture or another command, (ii) the viewport is automatically repositioned to a location farther along the route in response to the geographic application identifying a point of interest at the future location, (iii) the indicator of the future location is displayed along with a callout that provides such additional information as the time it will take the user to reach the future location, (iv) the indicator of the future location "snaps" to the indicator of the current location once the current location becomes visible in the viewport.

Still further, to visually place a location along a navigation route in perspective, the geographic application can automatically vary the zoom level of the viewport, as the user manually advances the viewport along the route to preview future locations, or as the geographic application advances the viewport in accordance with user's progress along the route. The geographic application can vary the zoom level in accordance with the distance remaining to the destination. More specifically, the geographic application can gradually decrease the zoom level (thereby raising the elevation of the virtual camera) as the user makes initial progress along a sufficiently long route from the source location, so that the user can "see" the route farther ahead. Once the destination becomes visible in the viewport, the geographic application can begin increasing the zoom level (thereby lowering the elevation of the virtual camera). When the route is relatively long, the geographic application can stop changing the zoom level once a certain level is reached.

One example implementation of this technique is a method for positioning viewports over interactive digital maps. The method includes (i) determining, by one or more processors, a navigation route for travelling from a source location to a destination location in a geographic area; (ii) displaying the navigation route over a digital map of the geographic area, including (ii-a) displaying a currently visible portion of the digital map in a viewport, via a user interface of a user device, and (ii-b) adjusting the position of the viewport as the user device moves toward the destination along the route or in response to a user command; and (iii) automatically adjusting a zoom level of the viewport based on a distance remaining to the destination location. In various implementations, the method may include one or more of the following additional features: (i) the zoom level automatically decreases to depict a digital map of a greater geographic area, as the viewport moves along the navigation route from the source toward the destination, so long as distance remaining to the destination is above a certain threshold value, (ii) the zoom level remains the same after reaching the threshold low value (dependent on the overall distance of the navigation route), until the destination becomes visible in the viewport, or until the distance remaining to the destination reaches a certain threshold value, (iii) the zoom level automatically increases to depict a digital map of a smaller geographic area, as the viewport moves along the navigation route from the source toward the destination, after the destination becomes visible in the viewport.

Moreover, the geographic application in some implementations can determine that the user device currently operates in a vehicle and, upon determining that the vehicle is in motion, "locks" viewport movement to the navigation route displayed via a user interface. More specifically, the geographic application simulates magnetic attraction of the viewport to the navigation route when the user applies a gesture to the viewport, so that the viewport moves along the navigation route displayed via a user interface. Otherwise, when the vehicle is not in motion, the geographic application repositions the viewport in accordance with the direction, acceleration, and/or other kinetic parameters of the gesture, without modifying the trajectory of the viewport in view of the geometry of the navigation route. The geographic application can lock viewport movement in response to a flick gesture (where the user communicates acceleration to the viewport during a brief contact with the touch surface) or a drag gesture (where the user maintains contact with the touch surface while the viewport is moving).

An example implementation of these techniques is a computing system configured to display a navigation route on a digital map. The computing system includes a display, such as a touchscreen of a smartphone or a screen embedded in the head unit of a vehicle, one or more input sensors (which can be embedded in a touchscreen), and processing hardware, such as one or more processors, coupled to the display and the input sensors. The processing hardware is configured to render a navigation route and a digital map on the display, detect an input gesture via the one or more input sensors, and (i) use a first interpretation of the input gesture (e.g., communicating motion to the viewport in accordance with only the kinetic parameters of the input gesture) if a lock condition (e.g., motion of the vehicle or an explicit user command) is not met, and (ii) use a second interpretation of the input gesture to reposition the viewport along the navigation route is the lock condition is met.

Another example implementation of these techniques is a method comprising (i) displaying a navigation route on a digital map, (ii) determining, by a computing device, whether one or more lock conditions are met, (iii) receiving, by the computing device, an input gesture, and (iv) in response to the input gesture: (a) if the one or more lock conditions are not met, repositioning the map independently of the route, by the computing device, or (b) if the one or more lock conditions not met, repositioning the map along the route, by the computing device.

DETAILED DESCRIPTION OF THE DRAWINGS

Overview of an Example System and Portable Device

Figure 1:
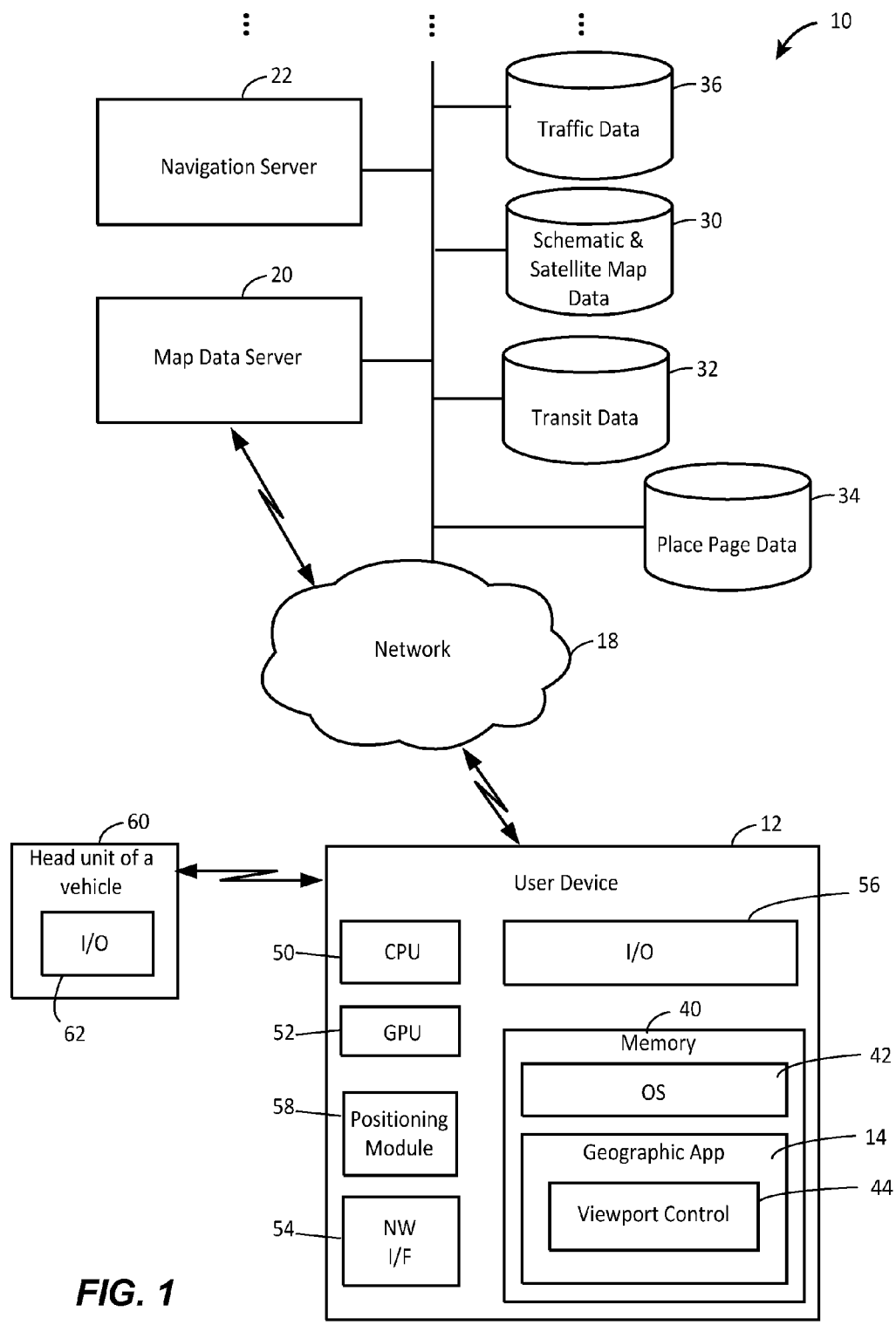
FIG. 1 is a block diagram of an example system in which a client device controls the viewport in view of user context, in accordance with the techniques of this disclosure.

FIG. 1 illustrates an example computing system 10 that can implement one or several techniques for dynamically controlling viewports via which digital maps are displayed.

The computing system 10 includes a user device 12 configured to execute a geographic application 14 that provides geographic content such as interactive digital maps, navigation directions, results of geospatial search queries, geographic suggestions, commercial geographic content, and other geospatial data. In addition to the user device 12 and any suitable number of user devices, the communication system 10 can include one or more geospatial content servers such as a map server 20 and a directions/navigation server 22. The map server 20 is configured to provide map data for rendering digital maps on client devices. The directions/navigation server 22 is configured to provide step-by-step navigation directions for driving, walking, bicycling, riding public transport, etc. In some implementations, the system 10 includes additional servers such as an autosuggest server configured to provide automatic geospatial suggestions and a commercial geographic content server that provides commercial geographic content such as advertisements, offers, and coupons (neither shown to avoid clutter). The user device 12 can access the map data server 20, the navigation server 22, and possibly other servers via a communication network 18, which can include wired and/or wireless communication links in any suitable configuration.

For simplicity, FIG. 1 depicts the servers 20 and 22 as individual servers. In general, however, each of the servers 20 and 22 can be implemented as any suitable network device or a group of network devices. For example, each of the servers 20 and 22 can include processing hardware such as one or more computing devices coupled to non-transitory computer-readable memory. The memory can include persistent storage, such as a hard disk or a flash drive, and/or non-persistent (transient) storage, such as a random-access memory (RAM) component.

The map server 20 in the example implementation of FIG. 1 is communicatively coupled to several databases such as a (i) a schematic and satellite database 30 storing street and road information, topographic data, satellite imagery, etc., (ii) a transit database 32 storing information related to public transport routes, schedules, alerts, prices, etc., (iii) a place page data 34 storing information about businesses including addresses, hours of operations, customer reviews, etc., (iv) a traffic database 36 storing current traffic conditions, and other databases. In general, the map server 20 can receive information related to geographic locations from any number of suitable databases, web services, etc. One or more operators can periodically update each of the databases 30-36 at respective frequencies. For example, the traffic database 36 may store real-time data, whereas the schematic and satellite database 30 may be updated relatively infrequently, such as once a week. Although FIG. 1 depicts the databases 30, 32, 34, and 36 as separate devices, these databases in general can be implemented in any suitable number of devices including non-transitory computer-readable memory. In various implementations, the databases 30, 32, 34, and 36 can be implemented in a single device or in several separate devices.

The schematic and satellite database 30 can store data in a raster format, a vector format, or both. Further, in some implementations, the data is organized into map tiles at multiple zoom levels to facilitate serving map data to client devices. Depending on the implementation, the map data server 20 can provide map and directions data to client devices separately or together in map tiles, for example.

In an example implementation, the computing device 12 is a portable device that includes processing hardware such one or more processors (CPU) 50 coupled to a memory 40, a graphics processing unit (GPU) 52, a network interface unit 54, an I/O module 56, and a positioning module 58. More generally, the techniques of this disclosure can be implemented in other types of devices, such as laptop computers, desktop computers, tablet computers, built-in car navigation units, wearable computing devices such as glasses or watches, etc.

The memory 40 may be tangible, non-transitory memory and may include any types of suitable memory modules, including random access memory (RAM), read only memory (ROM), flash memory, other types of persistent memory, etc. In addition to the geographic application 14, the memory 40 can store an operating system (OS) 42 and one or more applications or modules. The operating system 42 may be any type of suitable operating system, such as Android™ or iOS™, for example.

The network interface 54 can include hardware, firmware, and/or software components to support communications via long-range and/or short-range communication links. For example, to allow the user device 12 to communicate with the servers 20 and 22 via the network 18, the network interface 54 can support an appropriate version of the HTTP protocol layered over TCP/IP, for example. Further, to communicate with a vehicle head unit 60 via a short-range communication link, the network interface 54 can support Bluetooth™ and/or USB protocols, for example.

The I/O module 56 may be a touchscreen, for example, and the OS 42 can detect and recognize gesture-based input received via the I/O module 56. More generally, however, the I/O module 56 can detect two-dimensional gesture-based input or three-dimensional gesture-based input, via any suitable set of sensors, cameras, screens, etc. The positioning module 58 can include one or more proximity sensors, a Global Positioning System (GPS) receiver, a triangulation/trilateration component that uses WiFi™ signals, etc.

With continued reference to FIG. 1, the head unit 60 can include an I/O module 62, which can include a touchscreen or another sensor configured to detect gesture-based input. In another implementation, the head unit 60 includes only a conventional display, and the user device 12 projects information onto the display of the head unit 60. The head unit 60 can operate in any suitable vehicle, including a self-driving vehicle.

The geographic application 14 generates a digital map using vector graphics data, raster tiles, or map data in any other suitable format for display on a screen. In some cases, the geographic application 14 generates a 3D mesh to be textured using photographic images or other suitable description of 3D geometry for a geographic area. In various implementations and/or scenarios, the geographic application 14 displays schematic map views, satellite map imagery, imagery collected at a street level, or combinations of these views. The geographic application can overlay map imagery with navigation routes, search results, reviews, commercial content, and other information. Further, the geographic application can display map views from a top-down perspective, a street level perspective, a tilted perspective, etc.

Depending on the implementation, the geographic application 14 is a separate executable made up of compiled instructions that execute directly on the operating system 42, instructions in a scripting language (or another suitable format) that are interpreted at run time by another application such as a web browser, a plugin that extends the functionality of another software application, etc. In one example implementation, the geographic application 14 is an "app" downloaded onto the portable computing device 12 from a web server. In another implementation, the geographic application 14 is a web browser. In yet another implementation, the geographic application 14 is a "cloud" application that executes primarily on one or cloud servers (not shown) and exchanges input and output data with the computing device 12 in real time.

In operation, the geographic application 14 can requests map data and navigation data from the map data server 20 and the navigation server 22, respectively. The request from the geographic application 14 can indicate the current location of the user device 12, the current position of the map viewport, the current selection layer selection for the digital map being displayed (basic, traffic, transit, etc.). The servers 20 and 22 can provide an appropriate combination of data retrieved from one or more of the databases 30, 32, etc. The geographic application 14 can store the received information in the memory 40.

In at least some implementations, the user operates certain controls on the user device 12 or on a website associated with the map data server 20, and/or installs certain applications to allow servers to automatically provide automatic suggestions, provide commercial content to the user device 12, and/or receive indications of user interactions with the commercial content at the user device 12.

The geographic application 14 can include a viewport control module 44 configured to implement, at least partially, one or more of the techniques of this disclosure.

Controlling Gestured-driven Viewport Motion in View of User Context

For example, when the user device 12 displays a navigation route overlaid on a digital map via the I/O device 56 or, in a projected mode, the I/O device 62, the viewport control module 44 can adjust the movement of the viewport in view of the navigation route. Example operation of the viewport control module 44 is discussed below primarily with reference to navigation routes. However, the viewport control module 44 more generally can reposition the viewport in response to user gestures in view of a current user context, which can include, besides a navigation route, search results currently being displayed (with clusters of search results operating as "magnets" for the viewport), suggestions (similarly, with clusters of suggestions attracting the viewport), signals from the social graph, etc. As discussed in more detail below, current user context in some implementations can include motion, or lack of motion, of the vehicle in which the user device 12 operates.

Figure 2A:
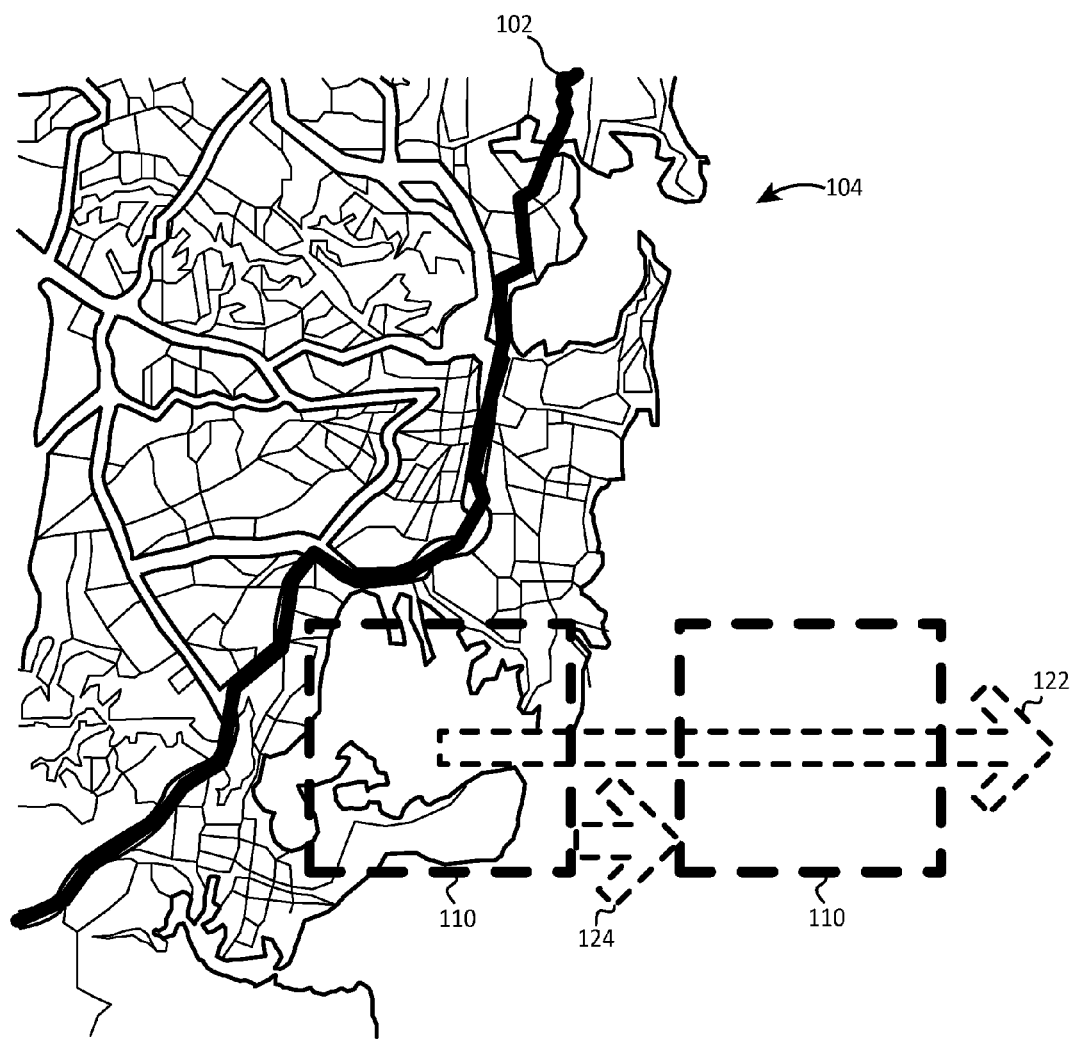
FIG. 2A is a combined screenshot/block diagram depicting an example scenario in which a viewport is repositioned with a flick gesture relative to a navigation route overlaid on a digital map, which can be implemented in the system of FIG. 1.

In the example scenario of FIG. 2A, a navigation route 102 is displayed as part of the digital map 104 or, depending on the implementation, as a graphic overlaying a digital map. The boundaries of the viewport 110, demarcating the currently visible portion of the map 104, are schematically illustrated as a substantially square shape. It is noted, however, that the viewport 110 in general can have any suitable shape, such as a rectangle, circle, oval, etc.

The user flicks the viewport 110 to communicate motion whose direction and magnitude are schematically depicted as arrow 122. More specifically, the direction of the arrow 122 corresponds to the direction of the motion, and the length of the arrow 122 corresponds to the magnitude of the direction, e.g., acceleration. The arrow 122 represents motion communicated to the viewport in the absence of route-specific factors. As referenced in this disclosure, the flick (or "swipe," "fling") gesture applied to a touchscreen includes a finger touchdown event over the area of being moved, movement of the finger in a particular direction while the finger is on the surface, and a finger takeoff event that is not perpendicular to the touchscreen, so that a certain acceleration is communicated to the area being moved after the finger takeoff event. In contrast, when the user "drags" the viewport 110, the user takes off his or finger while in a direction substantially perpendicular to the touchscreen, so that no acceleration is communicated to the viewport 110 after the finger takeoff event.

Thus, absent other factors, the acceleration communicated to the viewport 110 would result in the viewport 110 moving to a new position centered approximately at the tip of the arrow 122. However, the viewport control module 44 can determine that the navigation route 102 displayed as part of, or over, the map 104 defines the current user context. The viewport control module 44 further can determine that moving the viewport 110 as indicated by the arrow 122 would result in the viewport 110 not including any portion of the portion of the navigation route 102 and, in fact, would result in the viewport 110 being farther away from the navigation route 102.

Accordingly, to make it more difficult for the user to accidentally "stray" too far away from the navigation route 102 by a flick gesture, and then attempt to find the navigation route 102 again, the viewport control module 44 dampens the magnitude of the acceleration communicated to the viewport 110. As a result, the viewport control module 44 positions the viewport 110 as illustrated in FIG. 2A, in accordance with a vector illustrated as arrow 124. The arrow 124 thus illustrates that because no route is visible within the viewport, the acceleration due to flinging is dampened.

Figure 2B:
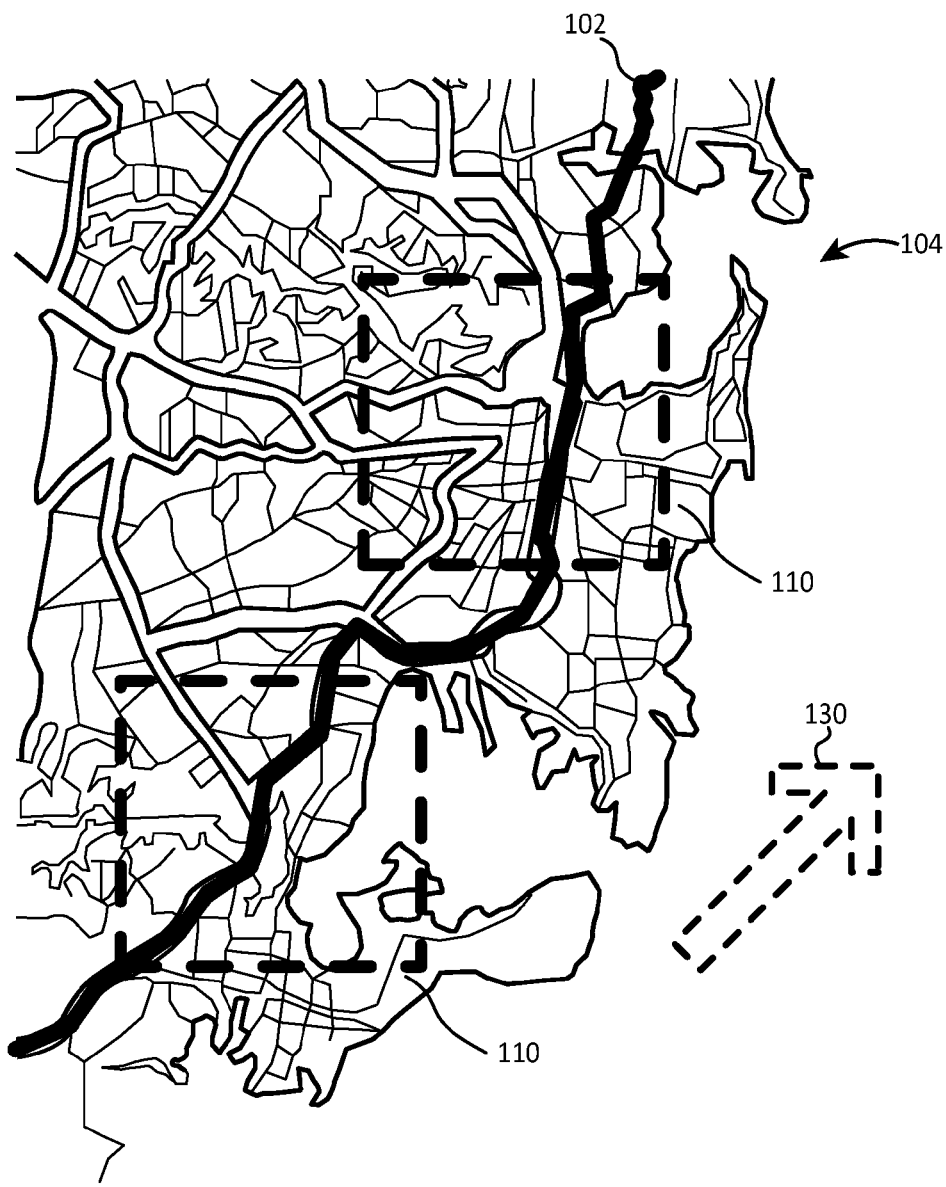
FIG. 2B is a combined screenshot/block diagram depicting another example scenario in which a viewport is repositioned is repositioned with a flick gesture relative to a navigation route overlaid on a digital map, which can be implemented in the system of FIG. 1.

In the scenario of FIG. 2B, the user communicates motion to the viewport 110 in the direction of arrow 130, with acceleration corresponding to the length of the arrow 130. The arrow 130 illustrates that because the road is visible, the viewport easily slides along the route, with the route operating as a virtual magnet. In this case, the user flicks the viewport 110 substantially along the navigation route 102. Accordingly, the viewport control module 44 repositions the viewport 110 so as to create an appearance of the viewport 110 easily sliding in the general direction of the segment of navigation route 102 covered by the viewport 110 in this scenario. More specifically, the viewport control module 44 in this case does not dampen the component of the motion parallel to the general direction of the navigation route 102.

Figure 2C:
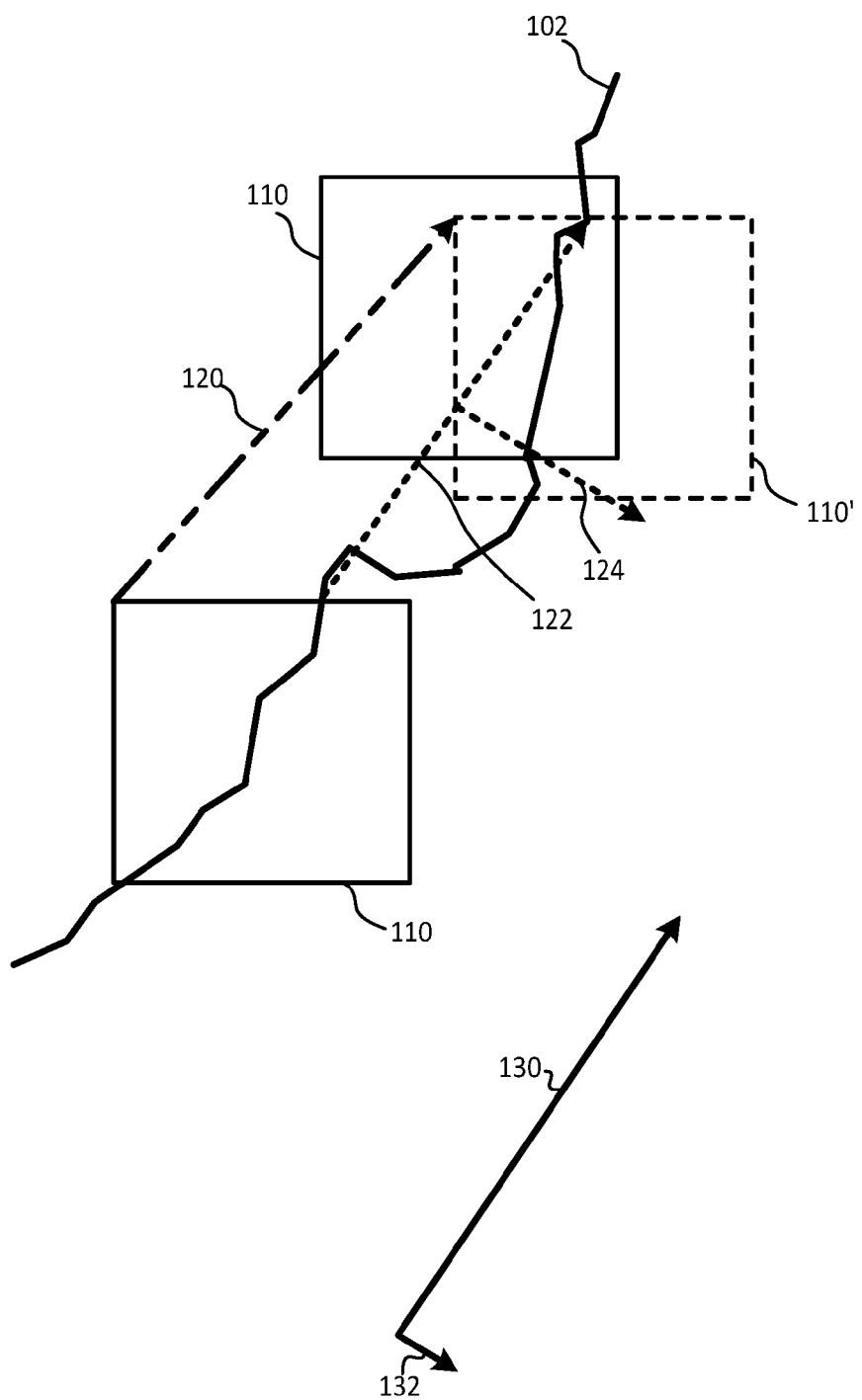
FIG. 2C is a diagram schematically illustrating how the viewport is repositioned in the scenario of the FIG. 2B.

For further clarity, FIG. 2C schematically illustrates how the viewport control module 44 calculates the position of the viewport in view of a flick gesture as well as in view of the navigation route (defining the current user context). As discussed below, the viewport control module 44 can determine the direction of portion of the route covered by a viewport ("direction-of-the-route" vector), determine the direction along which acceleration is communicated to the viewport ("direction-of-the-viewport" vector), apply basis decomposition to the direction-of-the-viewport vector do determine a component parallel to the direction-of-the-route vector (the "parallel component") and a component perpendicular to the direction-of-the-route (the "parallel component"), and apply a low-friction model to the parallel component and a damped-spring model to the perpendicular component.

In particular, a motion-of-the-viewport vector 120 corresponds to the direction and the magnitude of motion the user communicates to the viewport 110 with a flick gesture, and illustrates how the viewport 110 would be repositioned in accordance with the flick gesture in the absence of other factors (e.g., if a digital map were displayed with no navigation route 102, or some other overlay defining user context). The target position of the viewport 110 in accordance with the vector 120 is illustrated as viewport 110'.

A direction-of-the-route vector 122 illustrates the general direction of portion of the route 102 covered by the viewport 110. In this example implementation, the viewport control module 44 compares the point where one of the boundaries of the viewport 110 intersects the route 102 at its initial position to the point where the same boundary of the viewport 110 intersects the route 102 at its target position to generate the direction-of-the-route vector 122. The viewport control module 44 selects the boundary of the viewport 110 that most closely faces the direction of the vector 120. However, depending on the specific implementation, the viewport control module 44 can determine the approximate direction of the route 102 in any other suitable manner, such as by comparing the points at which the route 102 enters and exits the viewport 110 at its initial position only.

The viewport control module 44 then can decompose the motion-of-the-viewport vector 120 into two component vectors, one parallel to the direction-of-the-route vector 122 and the other perpendicular to the direction-of-the-route vector 122. These two vectors are illustrated in FIG. 2C as vectors 130 (component of the motion-of-the-viewport vector parallel to the direction-of-the-route vector) and 132 (component of the motion-of-the-viewport vector perpendicular to the direction-of-the-route vector), respectively.

The viewport control module 44 can apply different magnitude adjustment models to the vectors 130 and 132. In one example embodiment, the viewport control module 44 applies a low-friction model to the vector 130 and a damped-spring model to the vector 132. Thus, the viewport control module 44 can model motion in the direction of the vector 122 as motion of an object of a certain weight on a surface, with the coefficient of friction $\mu$ having a small value. The viewport control module 44 can model motion in the direction of the vector 124 as a motion of an object attached to the spring, where the other end of the spring is perpendicularly attached to the route 102. The vector 124 thus is perpendicular to the direction-of-the-route vector. As a result, the farther the viewport 110 travels away from the route 102 in response to a flick gesture, the more the spring is stretched, and the stronger the pull of the route 102 becomes. To the user, the viewport 110 appears to easily slide along the navigation route 102, both backward and forward, and appears to stick more and more as it travels away from the navigation route 102.

More generally, components of the motion-of-the-viewport vector 120 can be modified using linear or non-linear models along the directions 122 and 124. Further examples of modifying the direction and/or magnitude of the motion-of-the-viewport vector 120 include simulating a magnetic pull of the route 102 onto the viewport 110, so that the trajectory of the viewport 110 tends to "snap" onto the route 102, applying different friction or gravity coefficients along the directions 122 and 124 (so that, for example, moving the viewport 110 away from the route 102 in a perpendicular direction with a flick gesture feels to the user like pushing a shopping cart up an incline). It is noted that the viewport control module 44 can apply models that modify the direction of the motion-of-the-viewport vector 120, the magnitude of motion-of-the-viewport vector 120, or both.

The viewport control module 44 can simulate attraction of the route 102 according to any desired strength or weight, including the strength that effectively locks the viewport 110 onto the route 102, so that the viewport 110 slides over the route 102 in response to a flick in the general direction of the destination. Moreover, in some implementations, the viewport control module 44 can determine and utilize multiple direction-of the-route vectors for sub-sections of the route 102 rather than a single direction-of-the-route vector 122 for the entire section illustrated in FIG. 2C. For a single flick gesture, the viewport control module 44 then can modify different portions of the motion-of-the-viewport vector 120 differently in view of the corresponding vectors for the sub-sections of the route 102. As a result, when the flicks the viewport 110 as illustrated by the motion-of-the-viewport vector 120, the viewport control module 44 can modify the components of the motion-of-the-viewport vector 120 differently for the portion that is generally parallel to the direction-of-the-route vector 122 and for the portion that is almost perpendicular to the direction-of-the-route vector 122. As a result, the viewport 110 in this implementation follows a non-linear trajectory that more closely follows the geometry of the route 102.

Further, the geographic application 14 in some situations provides both the primary navigation route and one or several alternate routes. In these cases, the viewport control module 44 can simulate the magnetic, gravitational, etc. pull of the primary route as well as of the alternate route(s), but simulate a stronger pull of the primary route. In other words, when the user flicks the viewport 110, an alternate route should exert a stronger pull on the viewport 110 than an area of the map with no portion of a route, but a weaker pull that the primary navigation route. The strength of the pull of the primary route can be configured to be in any desired proportion to the strength of the pull of a secondary route, e.g., 2:1, 3:1, 4:1, etc.

Still further, when the destination of the navigation route 102 is within a certain distance of the viewport 110 (which may be expressed as a fixed threshold value, a percentage of the total distance, or a number of viewports that would fit between the current position and the destination, etc.), the viewport control module 44 can simulate magnetic, gravitational, etc. attraction of the viewport 110 to the destination. In other words, whereas the route 102 attracts the viewport as a set of points of segments making up a polyline, the destination of the route 102 also exerts an additional pull toward a single point.

Figure 2D:
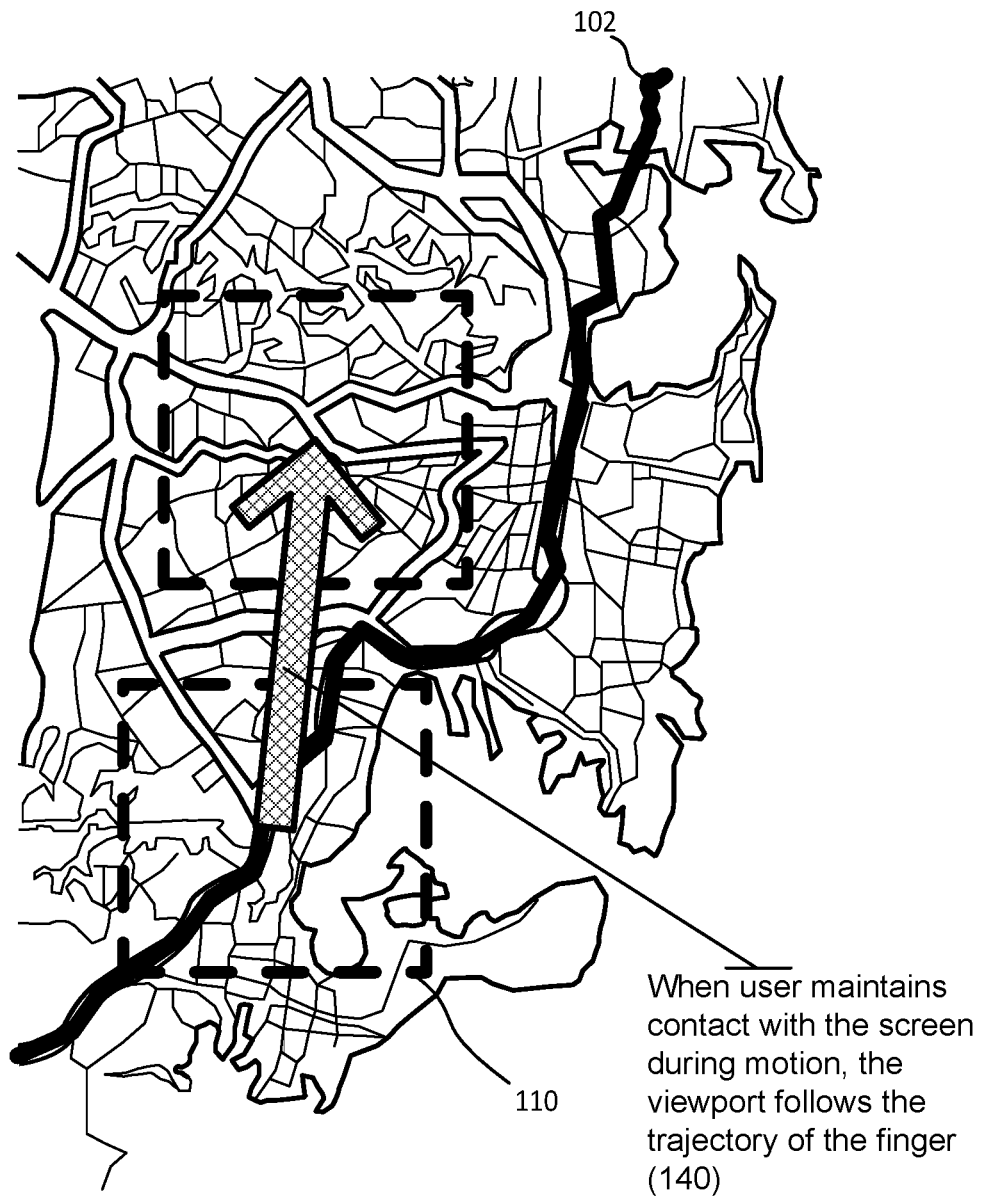
FIG. 2D is a combined screenshot/block diagram depicting an example scenario in which a viewport is repositioned with a gesture that maintains contact with the surface, which also can be implemented in the system of FIG. 1.

In contrast to the flick gesture discussed with reference to FIGS. 2A-C, the drag gesture can cause the viewport control module 44 in accordance with the gesture, regardless of the geometry and/or proximity of the route 102, and without modifying the trajectory in view of other factors related to the current user context. FIG. 2D schematically illustrates the user dragging the viewport 110 along a trajectory 140. In this scenario, the viewport control module 44 does not increase or decrease the perceived friction the viewport 110 encounters along the trajectory 140 because the user in this case presumably moves the viewport 110 to the new location he or she deliberately chooses. By contrast, when the user flicks the viewport 110, the user often intends the viewport 110 only approximately, and is more likely to send the viewport 110 to far from the navigation route 102. The trajectory 140 thus illustrates that when the user maintains contact with the screen during motion, the viewport follows the trajectory of the finger.

Figure 3:
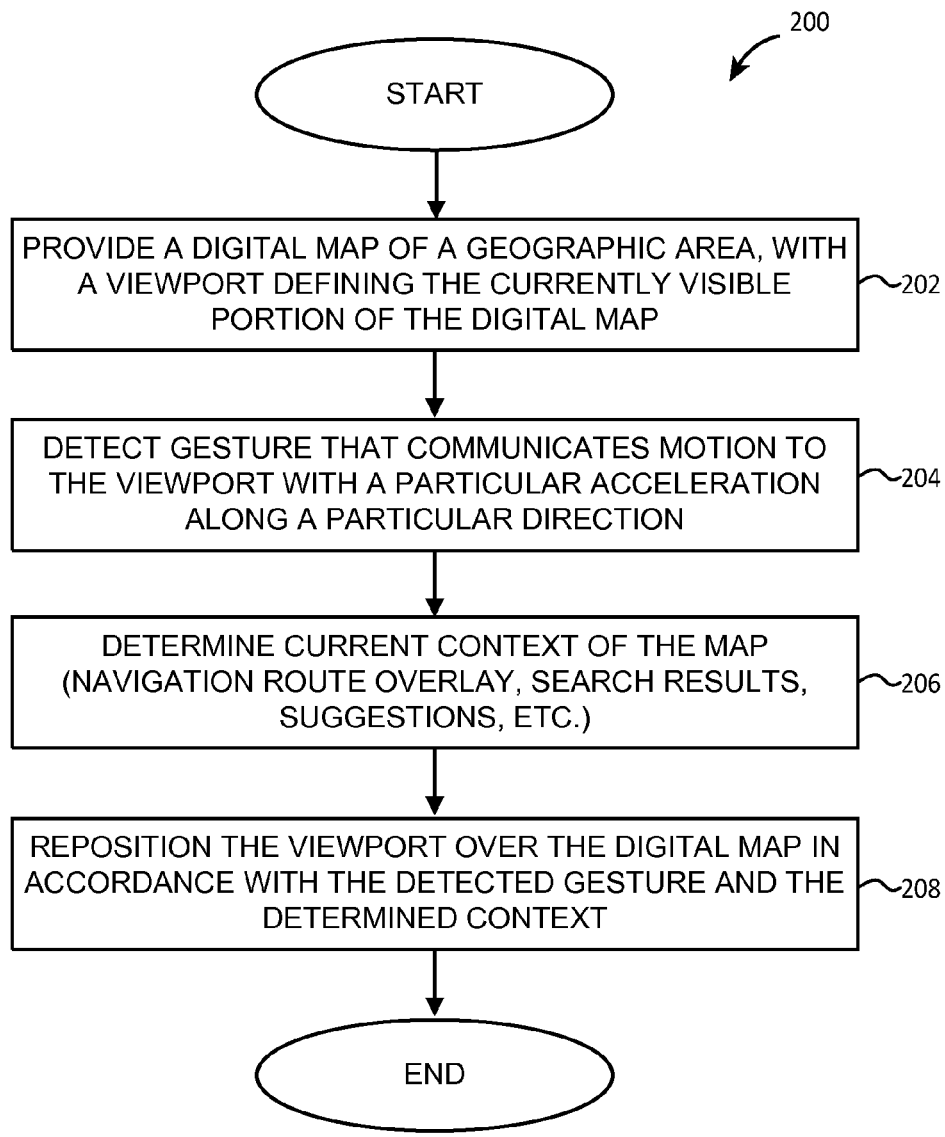
FIG. 3 is a flow diagram of an example method for positioning viewports over interactive digital maps, which can be implemented in the system of FIG. 1.

Now referring to FIG. 3, the method 200 can be implemented in the viewport control module 44, for example. More generally, the method 200 can be implemented as a set of instructions and executed on a user device, on a server, or in a distributed manner, for example.

The method 200 begins at block 202, where a digital map area of a geographic area is provided a user interface such as a touchscreen, for example. The viewport demarcates the currently visible portion of the digital map. As discussed above, the digital map can be displayed on the touchscreen of a portable user device, on the screen of a head unit in a projected mode (where a portable user device projects graphics onto a peripheral screen), on the screen of a non-portable device that supports gesture input, etc.

At block 204, a gesture such as a flick is detected. The gesture communicates motion to the viewport with a particular acceleration along a particular direction. Referring back to FIG. 1, the OS 42 can detect the gesture and report to the geographic application 14 as a set of parameters indicative of how quickly the user flicked a point on the touchscreen and in what direction. The geographic application 14 then can determine the flick was performed over the viewport and invoke the viewport control module 44.

Next, at block 206, the current context of the digital map is determined. The current context can correspond to a navigation route received in response to a request for navigation directions, a set of search results, a set of suggestions, a social networking context such as the location of the user's friends or content submitted by people in the user's social graph, etc.

Then, at block 208, the viewport is repositioned from its current location to a new location over the digital map in accordance with the gesture detected at block 204 as well as the context determined at block 206. For example, the viewport can be repositioned using the technique discussed with reference to FIG. 2C.

Figure 4:
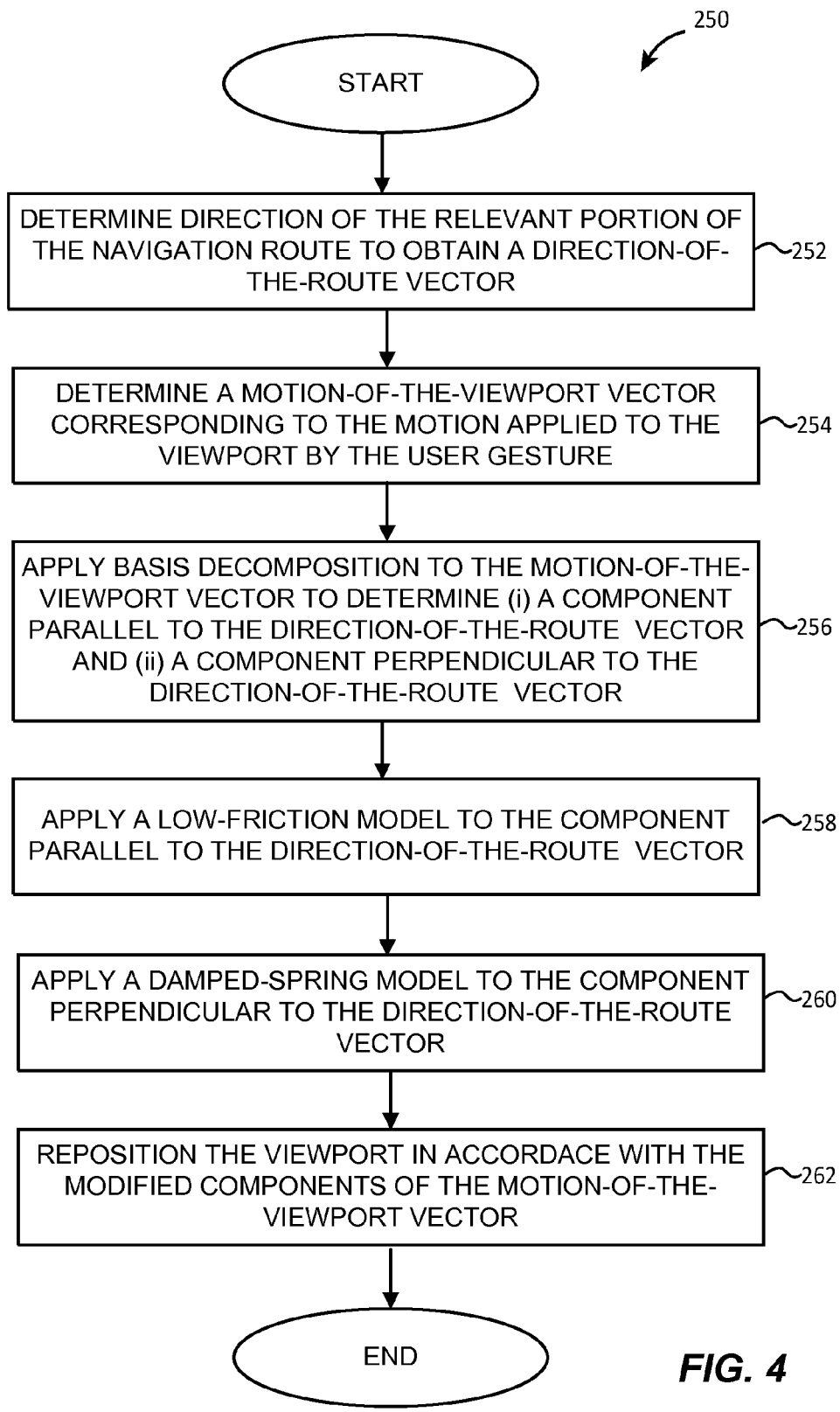
FIG. 4 is a flow diagram of an example method for determining a position of a viewport in view of several factors, which can be implemented in the system of FIG. 1.

As a more specific example of functionality that can be executed at block 208, FIG. 4 illustrates an example method 250 for determining the position of a viewport in view of several factors. Similar to the method 200, the method 250 can be implemented in the viewport control module 44 or a similar component.

At block 252, the general direction of a relevant portion of a navigation route is determined to obtain a direction-of-the-route vector. The relevance of the portion of the navigation route can be determined based on one or several of such factors as the overlap of the navigation route with the viewport at its current position, the position to which a flick gesture would reposition the viewport in the absence of contextual factors, and the geometry of the navigation route within a certain geographic area. As one example of the latter factor, a certain square region surrounding the current viewport can be selected, and a vector connecting the point where the route "enters" the region along the direction of travel to the point where the route "exits" the region can be determined.

At block 254, a motion-of-the-viewport vector is determined. This vector corresponds to the motion communicated to the viewport by the flick gesture in the absence of other factors. At block 256, basis decomposition is applied to the motion-of-the-viewport vector to identify a component parallel to the direction-of-the-route vector (the "parallel component") as well as a component perpendicular to the direction-of-the-route vector (the "perpendicular component"), as discussed in more detail above with reference to FIG. 2C.

Next, a low-friction model is applied to the parallel component and a damped-spring model is applied to the perpendicular component at blocks 258 and 260, respectively. The viewport is then repositioned in accordance with the motion-of-the-viewport vector modified at blocks 258 and 260.

Providing an Indication of Future Positions of the Viewport and/or Virtual Camera Example techniques for providing indications of future positions of a viewport and/or virtual camera are discussed next with reference to FIGS. 5A, 5B, and 6. These techniques can be implemented in the viewport control module 44 along with the techniques for modifying the position of a viewport discussed above, for example, or separately and independently of these techniques. For convenience, the examples of FIGS. 5A, 5B, and 6 are discussed with reference to the geographic application 14 and, in some cases, the viewport control module 44 of FIG. 1.

Figure 5A:
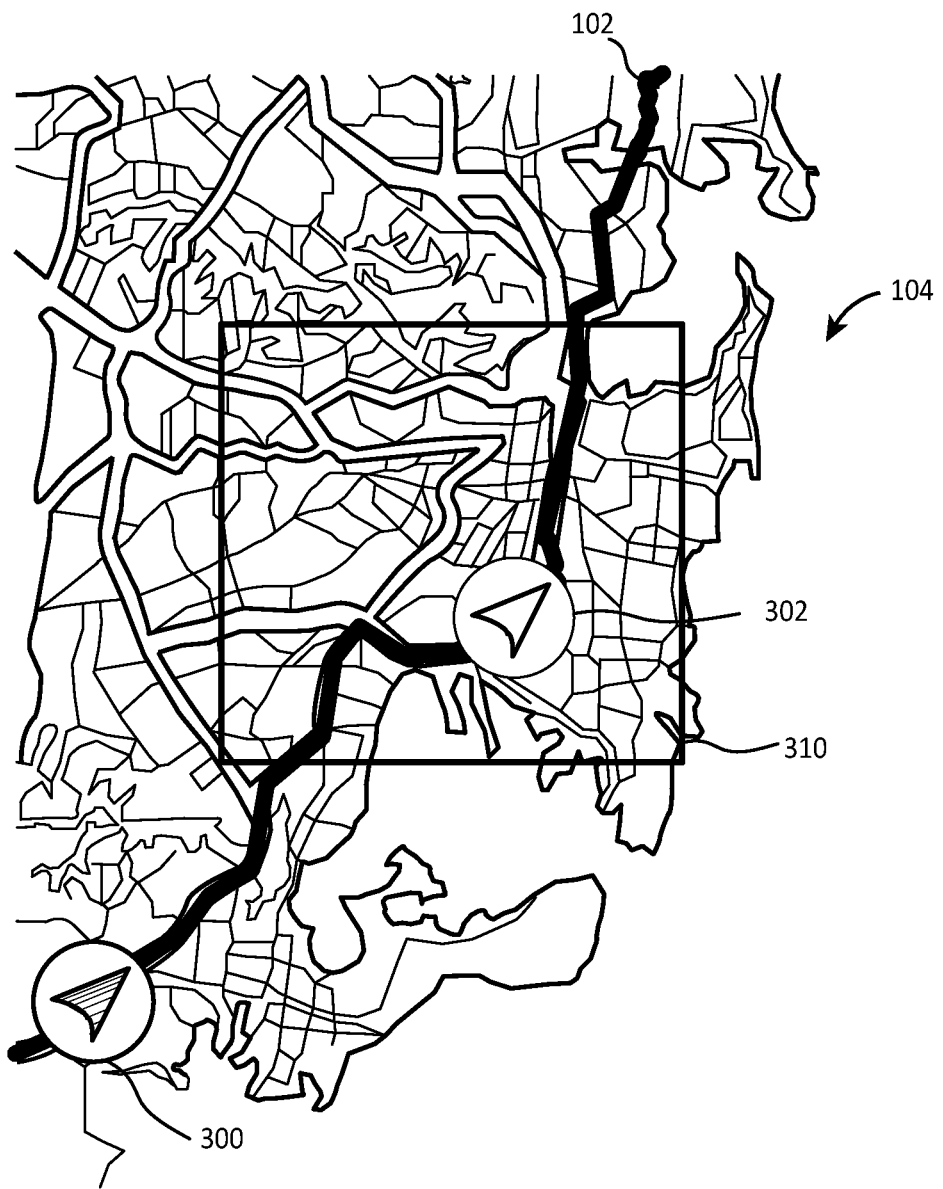
FIG. 5A is a combined screenshot/block diagram depicting an example indicator of future location displayed on a navigation route, which can be implemented in the system of FIG. 1.
Figure 5B:
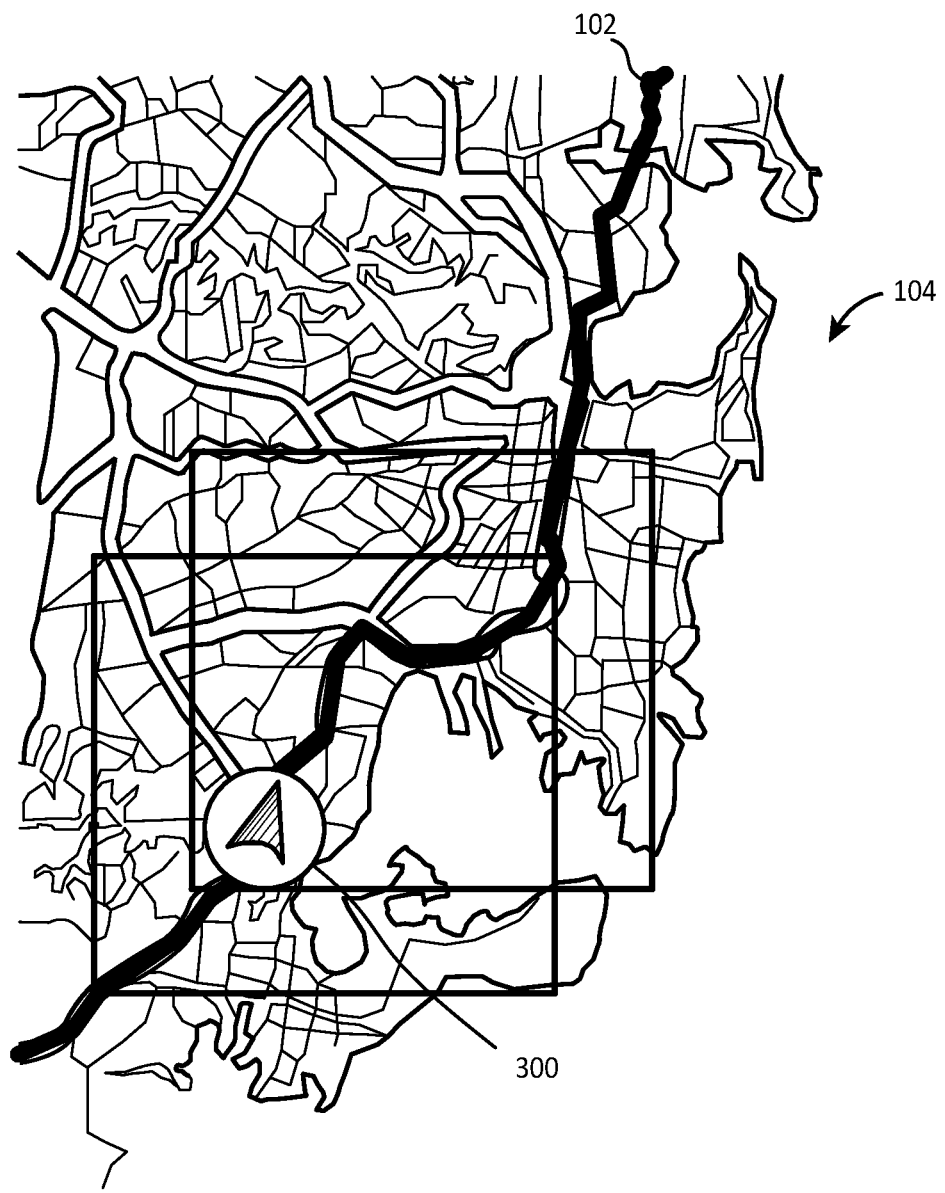
FIG. 5B is a combined screenshot/block diagram depicting an example indicator of future location merged with an indicator of current location, which can be implemented in the system of FIG. 1.
Figure 6:
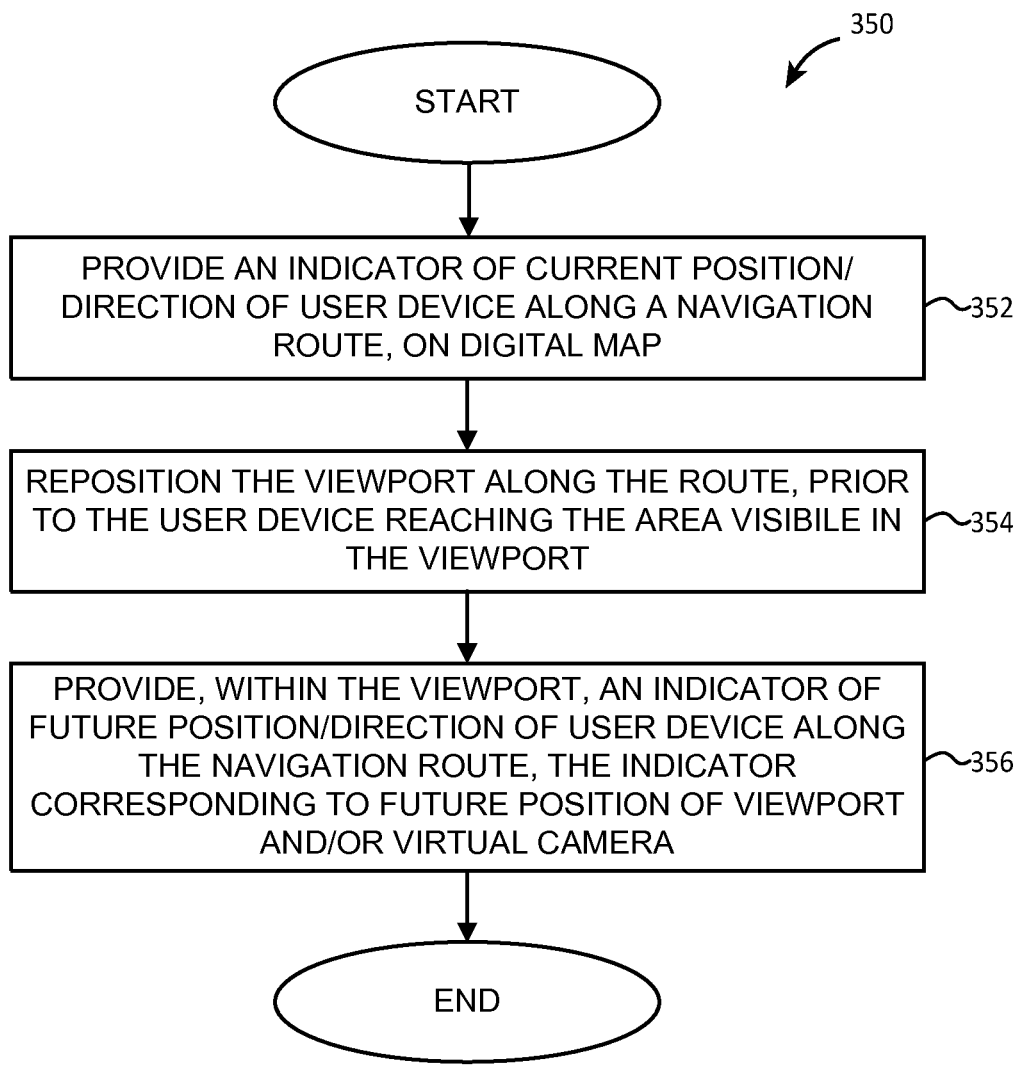
FIG. 6 is a flow diagram of an example method for providing an indicator of a future location along a navigation route, which can be implemented in the system of FIG. 1

As illustrated in FIG. 5A, a navigation route 102 is displayed on the digital map 104. The geographic application 14 can display an indicator 300 corresponding to the current location of the user device 12 on the navigation route 102 as well as the direction of travel. The indicator 300 can be referred to as the "current indicator." When the viewport control module 44 advances the viewport 310 in response to the user flicking the viewport 302 along the navigation route 102, for example, or automatically as part of previewing points-of-interest, search results, upcoming maneuvers, etc., the geographic application 14 can display an indicator 302 corresponding to the future location of the user device 12 on the navigation route 102 as well as the corresponding direction of travel. The indicator 302 can be referred to as the "future indicator."

More generally, the viewport control module 44 can display the future indicator 302 when the viewport is repositioned, and a portion of the navigation route which the user is expected to reach at some point becomes visible in the viewport 310. The geographic application 14 can display the future indicator 302 along with a callout that provides such additional information as the time it will take the user to reach the future location, for example.

The future indicator 302 can illustrate where the viewport 310 will be positioned (e.g., centered) once the user reaches the corresponding point on the route 102. Additionally or alternatively, the future indicator 302 can indicate the position and orientation of the virtual camera if the corresponding portion of the digital map 104 is displayed from a street-level perspective. In this manner, the user can have an idea of what he or she will see as part of the digital map once the corresponding location.

As illustrated in FIG. 5A, the future indicator 302 can be generally similar to the current indicator 300 while being sufficiently distinct to avoid confusion. For example, the future indicator 302 can have the same shape as the actual indicator 300 but a different color. Further, as illustrated in FIG. 5B, when the future indicator 302 becomes visible in the viewport also displaying the current indicator 300, the geographic application 14 can automatically remove the future indicator 302. In other words, the indicators 300 and 302 in this case "collapse" into a single indicator 300.

FIG. 6 is a flow diagram of an example method 350 for providing an indicator of a future location along a navigation route, which can be implemented in the geographic application 14 of FIG. 1. The method 350 in general can be implemented as a set of instructions and executed on a user device, on a server, or in a distributed manner, for example.

The method 350 begins at block 352, where an indicator of the current position and direction of a user device along a navigation route is provided on a digital map. At block 354, the viewport is repositioned along the route, prior to the user device reaching the area visible in the repositioned viewport. As discussed above, the viewport can be repositioned in response to manual or automatic signals.

At block 356, an indicator of the future position and orientation of the user device is provided in the viewport on the navigation route. Depending on the implementation, this indicator illustrates where the viewport will be centered and/or the location and orientation of the virtual camera when the user device reaches the corresponding position on the navigation route.

Dynamically Controlling the Zoom Level of the Viewport

Example techniques for dynamically controlling the zoom level of a viewport are discussed next with reference to FIGS. 7A, 7B, and 8. These techniques can be implemented in the viewport control module 44 along with the techniques for modifying the position of a viewport discussed above and the techniques for indicating future location along the route, for example, or separately and independently of these techniques. For convenience, the examples of FIGS. 7A, 7B, and 8 are discussed with reference to the geographic application 14 and, in some cases, the viewport control module 44 of FIG. 1.

Figure 7A:
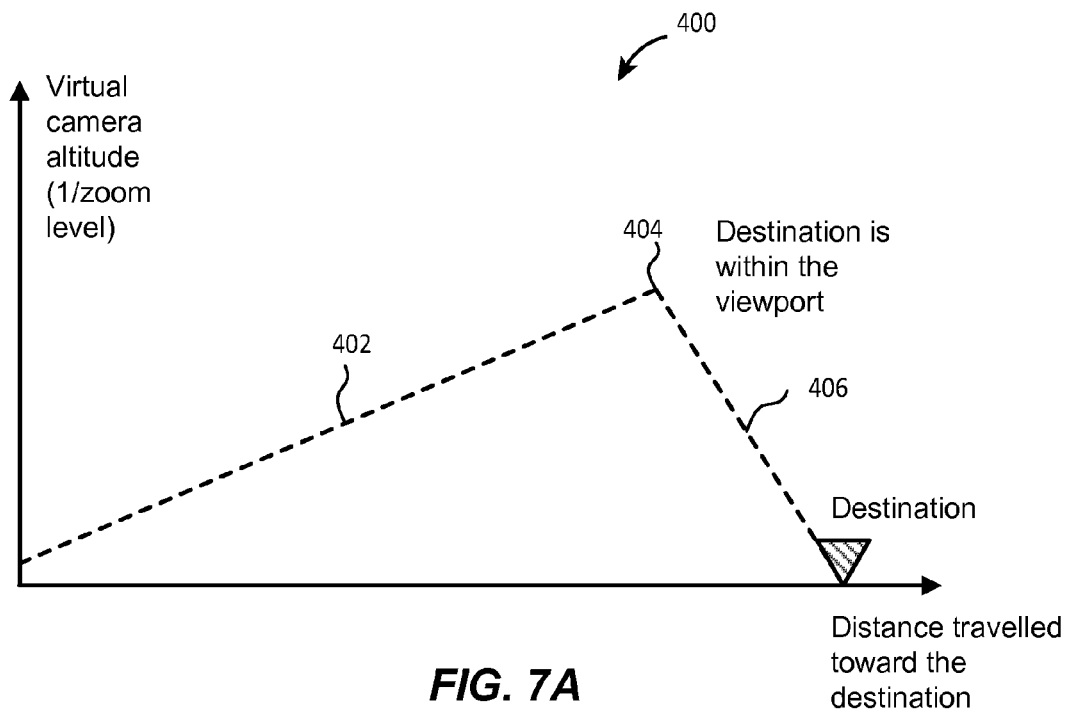
FIG. 7A depicts an example graph of the virtual camera altitude relative to the distance remaining to the destination along a navigation route, according to which the zoom level of a viewport can be set in the system of FIG. 1.
Figure 7B:
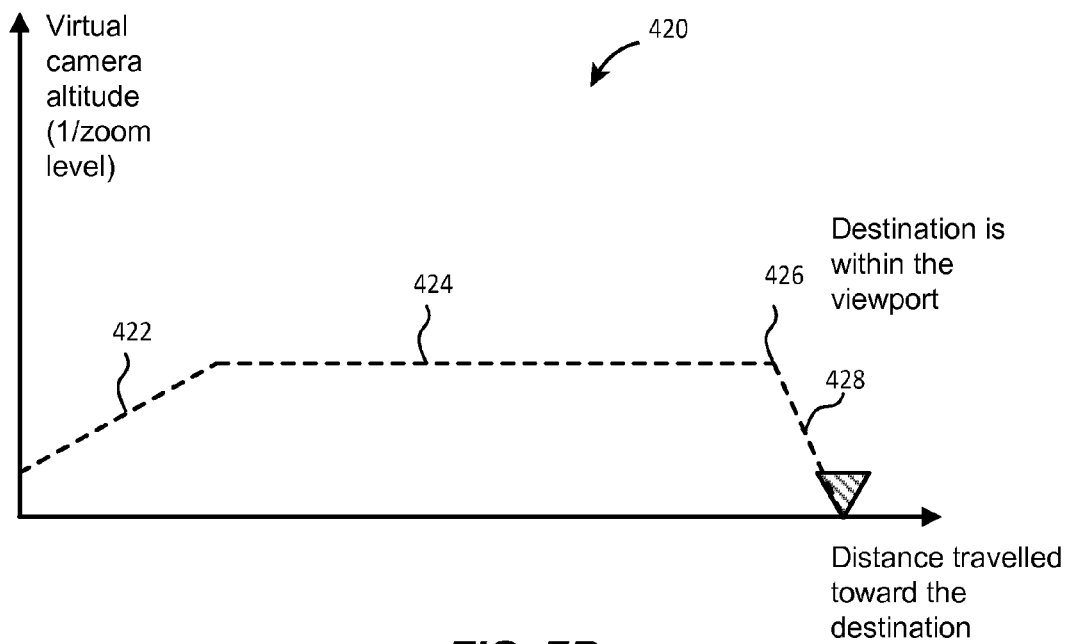
FIG. 7B depicts another example graph of the virtual camera altitude relative to the distance remaining to the destination along a navigation route, according to which the zoom level of a viewport can be set in the system of FIG. 1.
Figure 8:
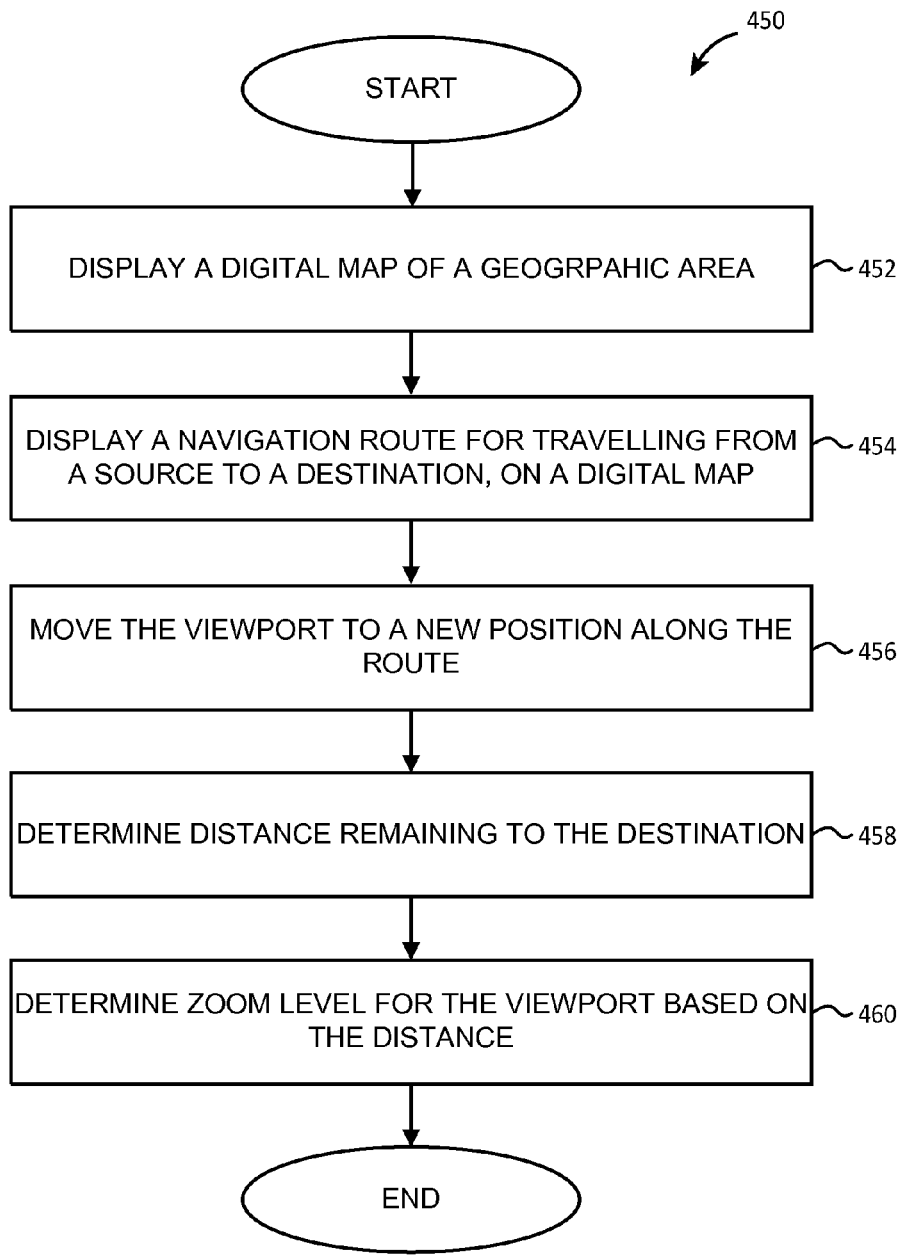
FIG. 8 is a flow diagram of an example method for dynamically determining the zoom level for a viewport in which portions of a navigation route, overlaid on a digital map, are displayed.

FIG. 7A depicts an example graph 400 according to which the viewport control module 44 can set the zoom level of the viewport as the viewport moves along the navigation in a preview mode (i.e., prior to the user device actually reaching the corresponding location) in response to a user gesture or an automatic signal, or as the user devices travels along the navigation route. In short, the techniques of FIGS. 7A, B, and 8 can be used whenever the viewport is repositioned over a digital map and an graphical indication of a navigation route overlays the digital map.

According to the graph 400, the geographic application 14 increases the altitude of the virtual camera in the segment 402 as the user makes initial progress along a navigation route toward a destination, so as to cover a larger geographic area and better illustrate to the user the overall route. Because the distance remaining to the destination remains relatively great in the segment 402, the altitude gradually increases. The increase can be linear or non-linear, depending on the implementation. Further, the slope of the segment 402 can be any suitable value, which in some embodiments depends on the overall distance between the source location and the destination. It is noted that the altitude of the virtual camera approximately corresponds to the inverse of the zoom level.

At point 404, the destination becomes visible within the viewport and, in response, the geographic application 14 can start decreasing the zoom level in segment 406, as the user probably does not need to see the map beyond the destination. Thus, the geographic application 14 in the segment 406 reduces the amount of data illustrated in the viewport beyond the destination. It is noted that the slope of the segment 406 can be different than the slope of the segment 402.

As illustrated in FIG. 7B, when the distance to the navigation route relatively great at a relatively high altitude of the virtual camera, the geographic application 14 can maintain same the zoom level constant until the destination becomes visible in the viewport. In this example, the altitude of the virtual camera increases in segment 422, remains constant in the segment 424 once a certain threshold altitude is reached, and decreases in segment 438 after the destination becomes visible at point 426. The threshold altitude can be determined based on the overall distance between the source and the destination (e.g., for trips under $D_1$ miles, the threshold altitude can be $D_1$, for trips between $D_1$ and $D_2$ miles, the threshold altitude can be $D_2$, etc., where $D_2 > D_1$.

In an example scenario, the user requests navigation directions for driving from her current location in San Francisco, Calif. to Mountain View, Calif. The initial altitude of the virtual camera is such that the use can view the map of approximately several square miles around the starting location. As the user moves the viewport along the navigation route to preview the route, the altitude of the virtual camera gradually increases so as allow the user see more and more of the map, until the user can "see" approximately 10 miles ahead. The altitude of the virtual camera reaches its maximum when the user can see approximately 20 miles ahead. Once Mountain View becomes visible in the viewport, the zoom level becomes decreasing. In another scenario, the navigation covers a much greater distance between San Francisco, Calif. and Denver, Colo. In this case, maximum altitude the virtual camera reaches may allow the user to see approximately 100 miles ahead.

FIG. 8 is a flow diagram of an example method 450 for dynamically determining the zoom level for a viewport in which portions of a navigation route, overlaid on a digital map, are displayed. The method 450 can be implemented as a set of instructions in the geographic application 14 of FIG. 1, for example, or in another suitable module.

At block 452, digital map of a geographic area is displayed. At block 454, a navigation route for travelling from a source to a destination is displayed over the digital map as an additional layer, for example. At block 456, the viewport is moved to a new position along the route. At block 458, the distance remaining to the destination is determined and, at block 460, the zoom level is determined for the viewport based on the distance.

Locking Viewport Movement to Navigation Route

Alternatively or additionally to the techniques discussed above, the viewport control module 44 (see FIG. 1) can lock viewport movement to the geometry of the navigation route in response to a lock condition, such as vehicle movement or an explicit user command. In the absence of lock conditions, the viewport control module 44 can reposition the viewport independently of the navigation route, e.g., according to only the kinetic properties of the input gesture that communications motion to the viewport. Thus, motion or lack of motion of the vehicle partially defines the current user context.

This approach may be particularly useful when the user views a navigation route in a projected mode, where the user device projects onto the screen embedded in the head of a vehicle. More specifically, when viewing maps on the head unit or a standalone screen of an in-car navigation system, the user often may wish to pan, scroll, or otherwise move the viewport to get a glimpse of upcoming turns, upcoming traffic and traffic on alternate routes, when available. This can be distracting when the user is driving because she can end up having panned a far away from her route. It is disconcerting to glance back at a map and not have that frame of reference. Although the driver can be completely prevented from panning and being thereby distracted, this approach can be frustrating for drivers because it limits the amount of information available to the driver, sometimes when she needs it most.

The techniques for locking viewport movement discussed below can be used with input gestures that include continuous contact with the touch surface while the viewport is moving (in other words, when the user "drags" the viewport), as well as with input gestures that do not involve continuous contact with the touch surface (e.g., the flick gesture discussed above). Both types of gestures are referred to below as "panning."

Figure 9:
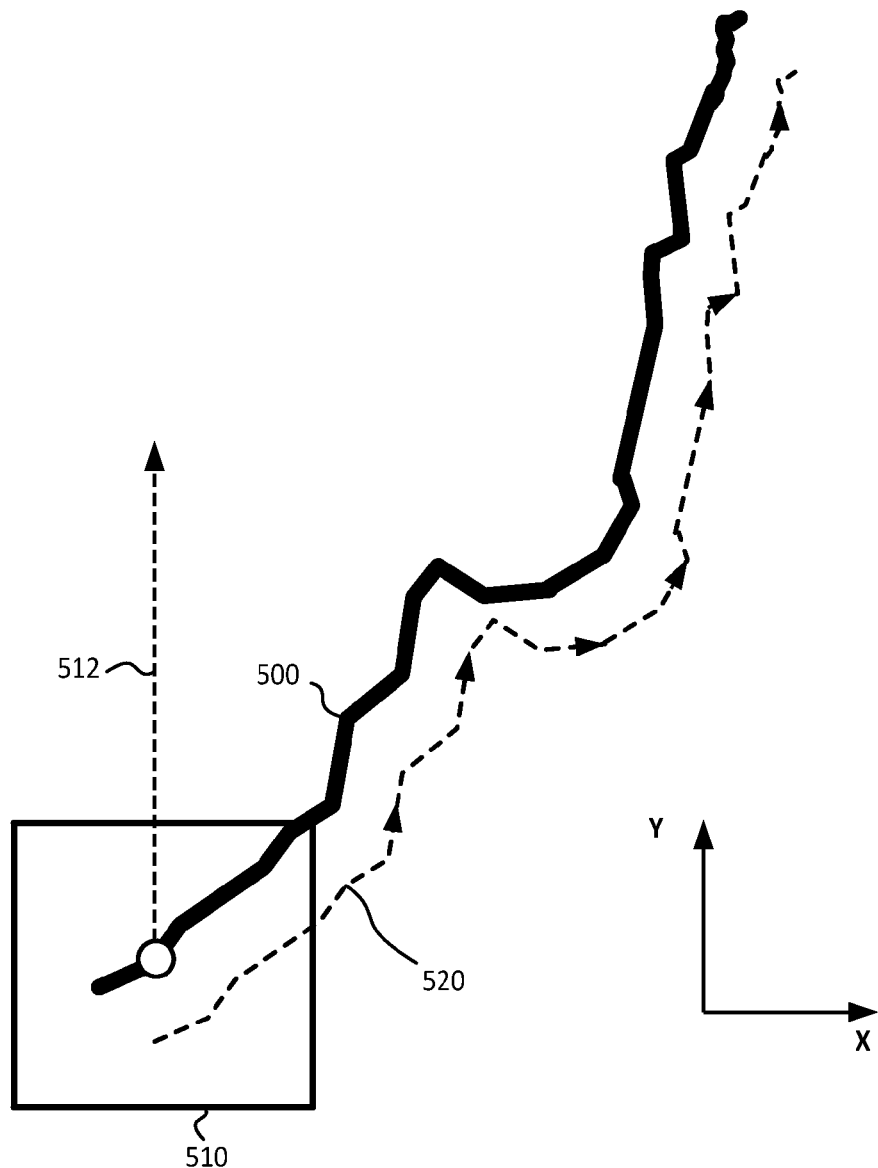
FIG. 9 schematically illustrates movement of a viewport along a navigation route or independently of a navigation route, depending on one or more lock conditions.

Referring to FIG. 9, the viewport control module 44 of FIG. 1 or similar module in an example scenario displays a navigation route 500 on a digital map (not illustrated in FIG. 9 to avoid clutter). The viewport control module 44 detects an input gesture using one or more input sensors, such as those operating in a touchscreen. In this particular example, the user communicates motion to a viewport 510 with or one several fingers in a direction 512. Depending on one or more lock conditions, the viewport control module 44 pans the viewport either in the direction 512 or along a trajectory 520, i.e., along the navigation route 500.

In the latter case, the virtual camera, which can be regarded as being at the center of the viewport 510 in a top-down view, follows the route 520 along the corners, curves, turns, etc. The viewport 510 thus is locked onto the route 500. In one implementation, when panning is locked onto the route 520, the center coordinates of the viewport 510 are always at or within a threshold distance of the route. In contrast, "standard" panning occurs independently of the geometry of the route 500, and the trajectory of the viewport 510 depends on only on the kinetic properties of the input gesture, such as direction and acceleration.

When the viewport 510 is locked onto the route 500, the user can pan ahead or back relative to his current position. In this example, if the direction of the input gesture has a positive y-component, the viewport control module 44 advances the viewport 510 forward along the route 500, in the direction indicated in FIG. 9 by the arrows superimposed on the trajectory 520. Otherwise, if the direction of the input gesture has a negative y-component, the viewport control module 44 moves the viewport 510 backward along the route 500. Similarly, if the direction of the input gesture has a positive x-component, the viewport control module 44 moves the viewport 510 forward along the route 500, and moves the viewport 510 backward along the route 500 otherwise. Depending on the implementation, the viewport control module 44 can check the x-component, the y-component, or both to determine how the viewport 510 should be moved when locked onto the route 500.

To determine whether a lock condition is met, the viewport control module 44 can determine whether the user device 12 appears to operate in a vehicle that is currently in motion. For example, the viewport control module 44 can invoke a certain application programming interface (API) function provided by the OS 42 of the user device 12 (see FIG. 1), which indicates the apparent mode of transportation of the user device 12 (e.g., walking, bicycling, driving). Further, the viewport control module 44 can invoke APIs to determine whether the user device 12 is currently coupled to the head unit 60 (see FIG. 1) via a wireless or wired communication link. However, as discussed above, when the user device 12 operates in a vehicle, the geographic application 14 can provide navigation directions via the native I/O module 56 or the I/O module 62 of the head unit 60.

In some scenarios, the user device 12 is coupled to the head unit 60, and software applications such as the geographic application 14 can invoke an API to retrieve gear information (e.g., "forward," "reverse," "park") from the vehicle and/or speed information, positioning information when the vehicle is equipped with a more sensitive positioning system, etc.

Additionally or alternatively, the geographic application 14 can include a user interface element for locking panning onto navigation routes. This element can be a button overlaid on the digital map, a configuration option accessible via an interactive menu. As another alternative, panning can be locked onto a route in response to a certain gesture or a voice command recognized by the geographic application 14.

In some implementations, when panning is locked onto the route 500, the viewport control module 44 can vary the rate at which the viewport 510 moves. For instance, the rate of panning can decrease when the viewport 510 comes up on turns (e.g. by effectively adding more inertial resistance to the gesture) or coming up on parts of the route with particularly bad traffic or other points deemed "interesting" based on map data and/or user preferences. Additionally or alternatively, the viewport control module 44 can synchronize a list or preview of upcoming maneuver instructions with the turn currently displayed on the digital map.

Further, when panning is locked onto the route 500, the viewport control module 44 in some implementations skips over or rapidly passes "uninteresting" parts of the route such as long stretches of highway with no traffic. For example, the viewport 510 may jump past the "uninteresting" part or move faster along the uninteresting parts. The viewport control module 44 can identify these uninteresting parts any suitable way: e.g., based on a threshold distance and traffic level for a series of segments, low density of points of interest, etc. Alternatively, the navigation server 22 can identify the uninteresting parts and include suitable indications in the navigation data provided to the user device 12.

Still further, in some implementations, the viewport control module 44 can pan the viewport 510 along the route 500 in response to one gesture and to display alternate routes in response to another gesture. For example, the viewport control module 44 can interpret a drag or other gesture along the x-axis as an input to select an alternate route to be displayed on a digital map, rather than input for panning the viewport 510 along the x-axis. The geographic application 14 can display an alternate route along with an estimated time of arrival, for example, to thereby allow the user to easily compare route options. The geographic application 14 and/or the navigation server 22 can cache alternate routes or calculate alternate routes "on-the-fly."

Figure 10:
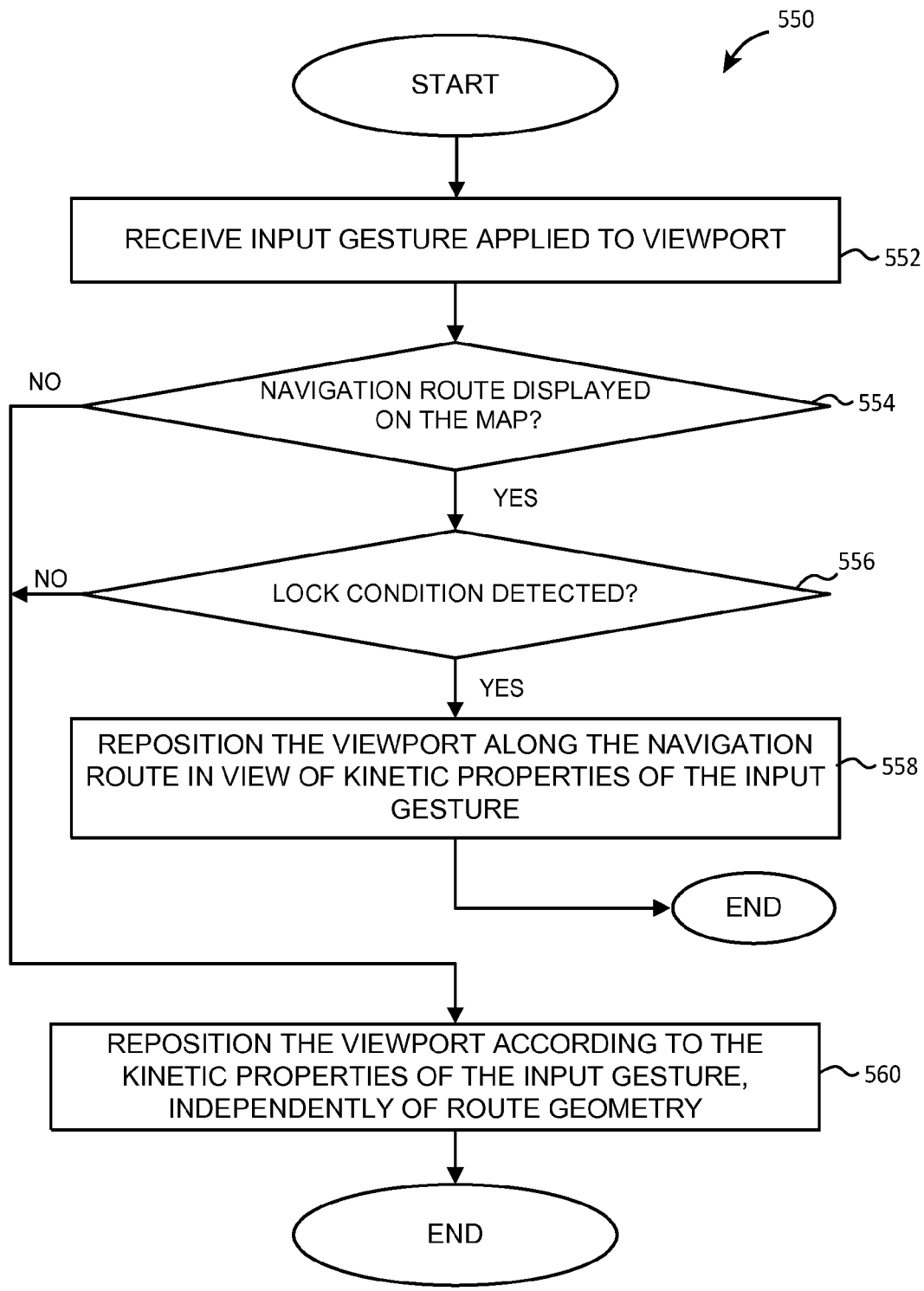
FIG. 10 is a flow diagram of an example method for repositioning a viewport in response to an input gesture, which can be implemented in the system of FIG. 1.

Now referring to FIG. 10, a method 500 can be implemented in the viewport control module 44, for example, to implement at least some of the techniques for locking a viewport onto a navigation route when one or more lock conditions are met. More generally, the method 200 can be implemented as a set of instructions and executed on a user device, on a server, or in a distributed manner, for example.

The method 200 begins at block 552, where an input gesture is received. The input gesture is applied to a viewport within which a digital map is displayed. At block 554, it is determined whether a navigation route is being displayed on a digital map. If no navigation route is being displayed, the flow proceeds directly to block 560. Otherwise, one or more lock conditions are checked at block 556. As discussed above, lock conditions can include operation of the user device in a vehicle that is currently in motion or an explicit user command, for example.

If one or more lock conditions are detected, the flow proceeds to block 558, where the viewport is repositioned along the navigation route in view of the direction, acceleration, and/or other kinetic properties of the input gesture. Otherwise, if no lock conditions are detected at block 556, the flow proceeds to block 560, where the viewport is repositioned accordingly to the kinetic properties of the input gesture but regardless of the geometry of the navigation route. The method 550 completes after executing block 558 or block 560.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain implementations are described herein as including logic or a number of components, modules, or mechanisms. Modules may constitute either software modules (e.g., code embodied on a machine-readable medium or in a transmission signal), firmware, or hardware modules. A hardware module is tangible unit capable of performing certain operations and may be configured or arranged in a certain manner. In example implementations, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one implementation" or "an implementation" means that a particular element, feature, structure, or characteristic described in connection with the implementation is included in at least one implementation. The appearances of the phrase "in one implementation" in various places in the specification are not necessarily all referring to the same implementation.

Upon reading this disclosure, those of ordinary skill in the art will appreciate still additional alternative structural and functional designs for dynamically controlling map viewports through the disclosed principles herein. Thus, while particular implementations and applications have been illustrated and described, it is to be understood that the disclosed implementations are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for positioning viewports over interactive digital maps, the method comprising:
    providing, by one or more processors, a digital map of a geographic area via a user interface of a computing device, including displaying a currently visible portion of the digital map in a viewport;
    displaying a navigation route for travelling from a source location to a destination location in the geographic area on the digital map;
    detecting, by one or more processors, a user gesture that communicates a particular acceleration to the viewport, along a particular direction, to move the viewport from its current position to a target position over the digital map;
    determining, by one or more processors, whether the computing device is operating in a vehicle that currently is in motion;
    determining, by one or more processors, a trajectory of the viewport to a new position over the digital map, including:
        modifying the direction communicated to the viewport in view of a geometry of the navigation route, so that the viewport is repositioned along the navigation route, when the computing device is determined to be operating in the vehicle that currently is in motion, and
        not modifying the direction communicated to the viewport in view of the geometry of the navigation route when the computing device is not determined to be operating in the vehicle that currently is in motion, to move the viewport in the direction of the user gesture; and moving the viewport from its current position to the new position.

2. The method of claim 1, further comprising determining the trajectory of the viewport relative to the geometry of the navigation route.

3. The method of claim 2, wherein determining the trajectory of the viewport includes dampening the acceleration communicated to the viewport when no portion of the navigation route is visible in the viewport.

4. The method of claim 2, wherein determining trajectory of the viewport includes modifying the direction communicated to the viewport to simulate attraction to the navigation route when at least a portion of the navigation route is visible in the viewport.

5. The method of claim 2, wherein determining the trajectory of the viewport includes modifying the direction communicated to the viewport to simulate attraction to the destination location when the destination location is visible in the viewport.

6. The method of claim 2, wherein determining the trajectory of the viewport includes:
(i) determining a first direction of the route relative to the viewport,
(ii) determining a second direction perpendicular to the first direction,
(iii) applying a low-friction model to a component of the acceleration communicated to the viewport along the first direction, and
(iii) applying a damped spring model to a component of the acceleration communicated to the viewport along the second direction.

7. The method of claim 2, further comprising:
displaying, within the viewport at the new position, a position indicator overlaying the navigation route, wherein the viewport is centered at the position indicator once the computing device reaches the location corresponding to the position indicator.

8. The method of claim 1, further comprising:
determining a primary navigation route for travelling from a source location to a destination location in the geographic area, and
determining an alternate navigation route for travelling from the source location to the destination location in the geographic area,
wherein determining the new position of the viewport includes:
simulating attraction of the viewport toward the primary navigation route with a first strength, and
simulating attraction of the viewport toward the secondary navigation route with a second strength,
wherein the first strength is larger than the second strength.

9. The method of claim 1, wherein:
the user interface includes a touch surface;
the user gesture is a first gesture in which motion parallel to the touch surface continues when there is no more contact with the touch surface;
the method further comprising:
detecting, by one or more processors in another instance, a second user gesture in which motion parallel to the touch surface occurs only when there is contact with the touch surface;
determining, by one or more processors, a new position of the viewport over the digital map in accordance with the second user gesture, independently of whether when computing device is determined to be operating in the vehicle that currently is in motion;
moving the viewport from its current position to the new position.

10. A computing device comprising:
a user interface configured to receive gesture-based input;
one or more processors; and
a non-transitory memory readable by the one or more processors, wherein the memory stores instructions that, when executed by the one or more processors, cause the computing device to:
provide a digital map of a geographic area via the user interface, including display a currently visible portion of the digital map in a viewport, display a navigation route for travelling from a source location to a destination location in the geographic area on the digital map, detect a user gesture that communicates motion to the viewport, determine how the viewport is to be repositioned over the digital map based on at least one of (i) a direction of the communicated motion relative to the navigation route (ii) a lock condition indicative of motion of the viewport being restricted to the navigation route, wherein the lock condition corresponds to the computing device operating in a vehicle that is currently in motion, and reposition the viewport in accordance with (i) the user gesture and (ii) the current user context lock condition.

11. The computing device of claim 10, wherein the instructions cause the computing device to:
when the lock condition is met, reposition the viewport along the navigation route, and
when the lock condition is not met, reposition in a direction of the user gesture, independently of a geometry of the navigation route.

12. The computing device of claim 10, wherein to determine the new position of the viewport, the instructions cause the computing device to dampen the acceleration communicated to the viewport when no portion of the navigation route is visible in the viewport.

13. The computing device of claim 10, wherein to determine the new position of the viewport, the instructions cause the computing device to modify the direction communicated to the viewport to simulate attraction to the navigation route when at least a portion of the navigation route is visible in the viewport.

14. The computing device of claim 10, wherein to determine the new position of the viewport, the instructions cause the computing device to modify the direction communicated to the viewport to simulate attraction to the destination location when the destination location is visible in the viewport.

15. The computing device of claim 10, wherein to determine the new position of the viewport, the instructions cause the computing device to:
(i) determine a first direction of the route relative to the viewport,
(ii) determine a second direction perpendicular to the first direction,
(iii) apply a low-friction model to a component of the acceleration communicated to the viewport along the first direction, and
(iii) apply a damped spring model to a component of the acceleration communicated to the viewport along the second direction.

16. The computing device of claim 10, wherein the instructions further cause the computing device to:
display, within the viewport at the new position, a position indicator overlaying the navigation route, wherein the viewport is centered at the position indicator once the computing device reaches the location corresponding to the position indicator.

17. The computing device of claim 10, wherein:
the user interface includes a touch surface;
the user gesture is a first gesture in which motion parallel to the touch surface continues when there is no more contact with the touch surface;
the instructions further configured to:
- detect, in another instance, a second user gesture in which motion parallel to the touch surface occurs only when there is contact with the touch surface;
- determine a new position of the viewport over the digital map in accordance with the second user gesture, independently of the lock condition,
move the viewport from its current position to the new position.

18. A method for positioning viewports over interactive digital maps, the method comprising:
providing, by one or more processors, a digital map of a geographic area via a user interface of a computing device, including displaying a currently visible portion of the digital map in a viewport;
determining a primary navigation route for travelling from a source location to a destination location in the geographic area;
determining an alternate navigation route for travelling from the source location to the destination location in the geographic area;
overlaying, by one or more processors, a graphical indication of the primary navigation route and the second navigation route on the digital map;
detecting, by one or more processors, a user gesture that communicates a particular acceleration to the viewport, along a particular direction, to move the viewport from its current position to a target position over the digital map;
determining, by one or more processors, a new position of the viewport over the digital map, including modifying at least one of the acceleration or the direction communicated to the viewport by the user gesture in view of the indication of the navigation routes, the modifying including:
- simulating attraction of the viewport toward the primary navigation route with a first strength, and
- simulating attraction of the viewport toward the secondary navigation route with a second strength, wherein the first strength is larger than the second strength; and moving the viewport from its current position to the new position.

19. The method of claim 18, wherein modifying at least one of the acceleration or the direction communicated to the viewport by the user gesture includes simulating attraction of the viewport to the destination location when the destination location is visible in the viewport.

* * * * *